US012203243B2

(12) United States Patent
Bridenbaugh et al.

(10) Patent No.: US 12,203,243 B2
(45) Date of Patent: Jan. 21, 2025

(54) CONTROLLING AN IMPLEMENT BASED ON DETERMINING A TARGET POSITION OF THE IMPLEMENT

(71) Applicant: Caterpillar Inc., Peoria, IL (US)

(72) Inventors: Michael William Bridenbaugh, Pittsburgh, PA (US); Bradley Paul Krone, Dunlap, IL (US); Joseph Leo Faivre, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 17/654,960

(22) Filed: Mar. 15, 2022

(65) Prior Publication Data

US 2023/0295901 A1    Sep. 21, 2023

(51) Int. Cl.
*G05D 1/00*   (2024.01)
*E02F 9/20*   (2006.01)
*E02F 9/22*   (2006.01)
*E02F 9/26*   (2006.01)

(52) U.S. Cl.
CPC .............. *E02F 9/264* (2013.01); *E02F 9/205* (2013.01); *E02F 9/2228* (2013.01); *E02F 9/261* (2013.01); *G05D 1/0038* (2013.01)

(58) Field of Classification Search
CPC ...................................................... E02F 9/264
See application file for complete search history.

(56) References Cited

U.S. PATENT DOCUMENTS

| | | | |
|---|---|---|---|
| 5,244,441 A * | 9/1993 | Dempster | A63B 23/00 482/901 |
| 10,316,491 B2 | 6/2019 | Gentle et al. | |
| 10,671,074 B2 | 6/2020 | Hashimoto et al. | |
| 10,767,341 B2 | 9/2020 | Hashimoto | |
| 10,822,771 B2 * | 11/2020 | Ishibashi | E02F 3/845 |
| 10,876,272 B2 | 12/2020 | Faivre et al. | |
| 10,961,686 B2 | 3/2021 | Green et al. | |
| 11,021,853 B1 * | 6/2021 | Seacat | E02F 3/3604 |
| 2014/0102799 A1 * | 4/2014 | Stringer | E21B 3/02 175/73 |
| 2014/0180579 A1 * | 6/2014 | Friend | G01S 19/48 701/518 |
| 2016/0273194 A1 * | 9/2016 | Ikegami | E02F 9/2267 |
| 2020/0370281 A1 | 11/2020 | Takaoka et al. | |
| 2021/0259147 A1 * | 8/2021 | Yamaguchi | A01B 63/1006 |

* cited by examiner

*Primary Examiner* — Aryan E Weisenfeld
*Assistant Examiner* — Paul W Arellano

(57) ABSTRACT

One or more devices may receive target position data indicating a target position of an implement of the machine, the target position being determined based on operator control data indicating a position of an operator control associated with the machine. The one or more devices may determine a current position of the implement. The one or more devices may determine a command that causes the implement to move from the current position to the target position, wherein the command is determined based on the target position and the current position. The one or more devices may provide the command to cause the implement to move from the current position to the target position.

20 Claims, 3 Drawing Sheets

CONTROLLING AN IMPLEMENT BASED ON DETERMINING A TARGET POSITION OF THE IMPLEMENT

TECHNICAL FIELD

The present disclosure relates generally to remotely controlling a machine and, for example, to remotely controlling an implement of the machine based on a target position of the implement.

BACKGROUND

A dozer can be operated using a remote control device. The remote control device may provide commands that are transmitted wirelessly to the dozer. For example, an amount of a movement of a joystick (of the remote control device) is transmitted to the dozer. The movement of the joystick is proportional to a hydraulic flow of a hydraulic system that controls a movement of a blade of the dozer. In some instances, a wireless transmission of the commands may be subject to latency. Accordingly, the latency may negatively affect an operation of the dozer using the remote control device. For example, attempting to smooth out a ground surface using a blade of the dozer can be a complex operation, to be performed by the remote control device, due to the latency.

The latency may create a measure of uncertainty with respect to a command by the remote control device and a resulting position of the blade. For example, a transmission of the amount of the movement of the joystick may be delayed. As a result of the delayed transmission of the amount of the movement of the joystick, the movement of the blade (that is to occur as a result of the movement of the joystick) may be delayed.

In this regard, a measure of quality of work performed using the remote control device may be less than a measure of quality of work performed using an operator control in an operator cabin of the dozer. Additionally, the latency may cause multiple attempts of a same operation to be performed prior to achieving a desired result (e.g., multiple attempts to smooth out the ground surface to be performed prior to achieving a desired smoothness of the ground surface). The multiple attempts may consume computing resources, network resources, and other resources.

The system of the present disclosure solves one or more of the problems set forth above and/or other problems in the art.

SUMMARY

A method performed by one or more devices associated with a machine includes receiving target position data indicating a target position of an implement of the machine, the target position being determined based on operator control data indicating a position of an operator control associated with the machine; determining a current position of the implement; determining a command that causes the implement to move from the current position to the target position, wherein the command is determined based on the target position and the current position; and providing the command to cause the implement to move from the current position to the target position.

A system comprising: a controller, of a machine, configured to: determine a target velocity of an implement of the machine, wherein the target velocity is determined based on operator control data indicating a position of an operator control associated with the machine; determine a target position of the implement based on the target velocity; determine a current position of the implement; determine a command that causes the implement to move from the current position to the target position, wherein the command is determined based on the target position and the current position; and provide the command to cause the implement to move from the current position to the target position.

A controller of a machine includes one or more memories; and one or more processors configured to: receive target position data indicating a target position of an implement of the machine, determine a current position of the implement; determine a command that causes the implement to move from the current position to the target position, wherein the command is determined based on the target position and the current position; and provide the command to cause the implement to move from the current position to the target position.

DETAILED DESCRIPTION

The present disclosure is directed to a system for remotely controlling an implement of a machine, such as a blade of a dozer. The system may determine target position data indicating a target position of the implement. The target position data may be determined based on operator control data indicating a position of an operator control (e.g., a joystick) of a remote control device that controls the machine. In this regard, the system may translate a movement of the operator control to the target position of the implement. The translation of the movement of the operator control (to the target position of the implement) may be performed onboard of the dozer. Alternatively, the translation of the movement of the operator control may be performed offboard the dozer and the target position of the implement may be transmitted to the dozer.

The system may determine a current position of the implement and determine a command that causes the implement to move from the current position to the target position. For instance, the system may determine a flow of hydraulic fluid needed to move the implement from the current position to the target position.

The system may provide the command to cause the implement to move from the current position to the target position. For example, the system may provide the valve command to cause the valve to control the flow of the hydraulic fluid to cause a movement of the implement to the target position.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
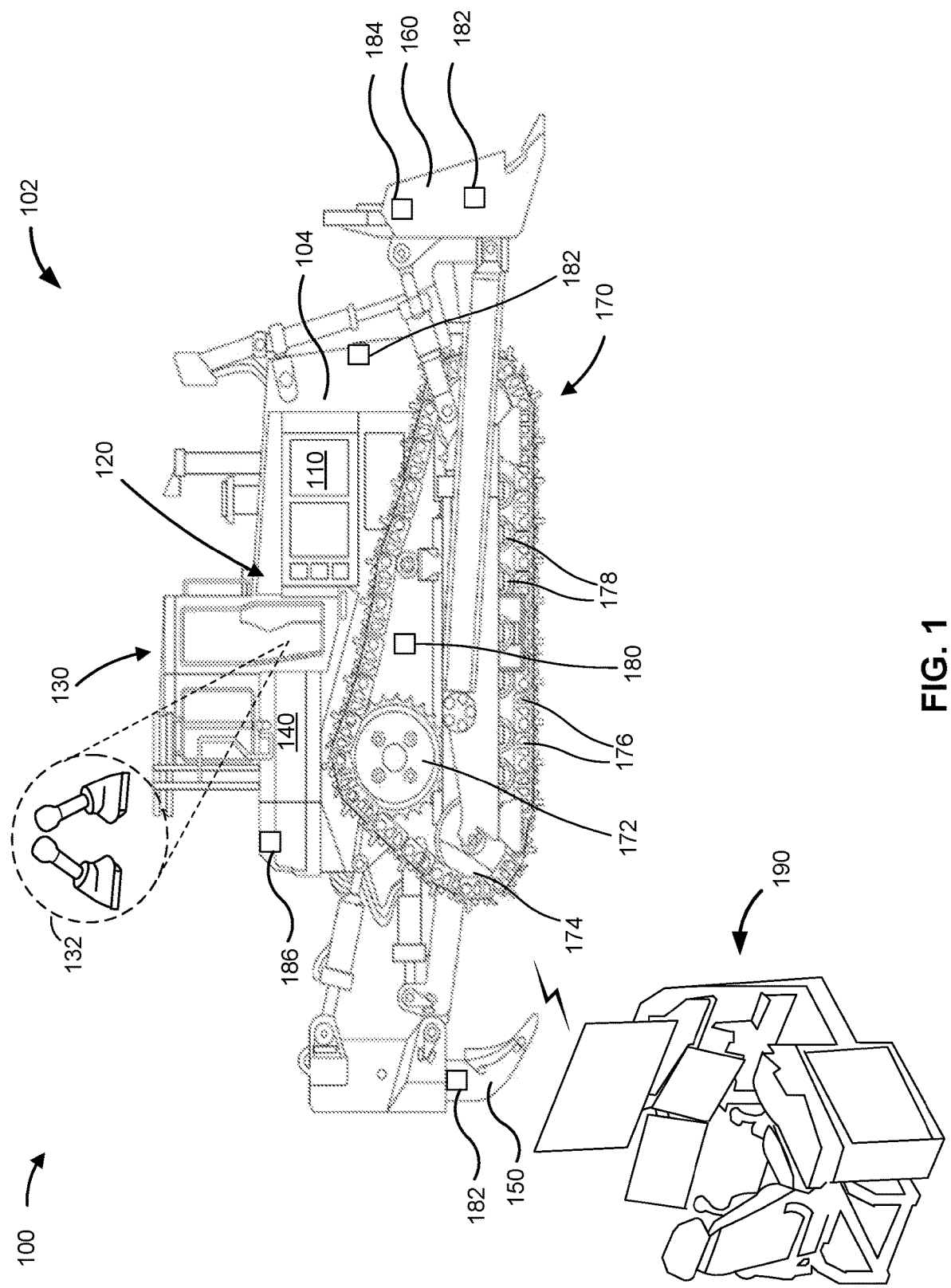
FIG. 1 is a diagram of an example machine described herein.

FIG. 1 is a diagram of an example implementation 100 described herein. As shown in FIG. 1, example implementation 100 includes a machine 102 and a remote control device 190. Machine 102 is as an earth moving machine, such as a dozer. Alternatively, machine 102 may be another type of machine, such as an excavator, a wheel loader, among other examples.

As shown in FIG. 1, machine 102 includes a chassis 104, an engine 110, a sensor system 120, an operator cabin 130, operator controls 132, a controller 140, a rear attachment 150, a front attachment 160, ground engaging members 170, sprocket 172, one or more idlers 174, one or more track links 176, one or more rollers 178, a transmission control system 180, one or more inertial measurement units (IMUs) 182, and a global positioning system (GPS) device 184.

Engine 110 may include an internal combustion engine, such as a compression ignition engine, a spark ignition engine, a laser ignition engine, a plasma ignition engine, and/or the like. Engine 110 provides power to machine 102 and/or a set of loads (e.g., components that absorb power and/or use power to operate) associated with machine 102. For example, engine 110 may provide power to one or more control systems (e.g., controller 140), sensor system 120, operator cabin 130, and/or ground engaging members 170.

Engine 110 can provide power to an implement of machine 102, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 102.

Sensor system 120 may include sensor devices that are capable of generating signals regarding an operation of machine 102. The sensor devices, of sensor system 120, may include a velocity sensor device, a load sensor device, a pressure sensor device, a position sensor device, a temperature sensor device, a vibration sensor device, a motion sensor device, among other examples.

Operator cabin 130 includes an integrated display (not shown) and operator controls 132. Operator controls 132 may include one or more input components (e.g., integrated joysticks, push-buttons, control levers, and/or steering wheels) to control an operation of machine 102. For example, operator controls 132 may be used to control an operation of one or more implements of machine 102 (e.g., rear attachment 150 and/or front attachment 160) and/or control an operation of ground engaging members 170.

For an autonomous machine, operator controls 132 may not be designed for use by an operator and, rather, may be designed to operate independently from an operator. In this case, for example, operator controls 132 may include one or more input components that provide an input signal for use by another component without any operator input.

Controller 140 (e.g., an electronic control module (ECM)) may control and/or monitor operations of machine 102. For example, controller 140 may control and/or monitor the operations of machine 102 based on signals from operator controls 132, from sensor system 120, from IMUs 182, GPS device 184, and/or from remote control device 190, as described in more detail below.

Rear attachment 150 may include a ripper assembly, a winch assembly, and/or a drawbar assembly. Front attachment 160 may include a blade assembly. Front attachment 160 and/or rear attachment 150 may be referred to as implements of machine 102. Ground engaging members 170 may be configured to propel machine 102. Ground engaging members 170 may include wheels, tracks, rollers, and/or similar components, for propelling machine 102. Ground engaging members 170 may include an undercarriage that includes tracks (as shown in FIG. 1). The tracks may include track links 176.

Sprocket 172 may include one or more sprocket segments. Sprocket 172 may be configured to engage with ground engaging members 170 and to drive ground engaging members 170. In some examples, one or more idlers 174 and/or one or more rollers 178 may guide the tracks as the tracks rotate to propel machine 102. In some examples, sprocket 172 may be part of a transmission of machine 102.

Transmission control system 180 may include one or more devices that are capable of receiving, generating, storing, processing, and/or providing signals that may be used to control the transmission of machine 102. As shown in FIG. 1, IMUs 182 are installed at different positions on components or portions of machine 102, such as, for example, on chassis 104, on rear attachment 150, and/or on front attachment 160.

An IMU 182 includes one or more devices that are capable of receiving, generating, storing, processing, and/or providing signals that may be used to determine a position and orientation of a component, of machine 102, on which the IMU 182 is installed. For example, IMU 182 may include one or more accelerometers and/or one or more gyroscopes.

The one or more accelerometers and/or the one or more gyroscopes generate and provide signals that can be used to determine a position and orientation of the IMU 182 relative to a frame of reference and, accordingly, a position and orientation of the component. For example, an IMU 182 may provide signals that may be used to determine a current position of the implement of machine 102 relative to chassis 104. While the example discussed herein refers to IMUs 182, the present disclosure is applicable to using one or more other types of sensor devices that may be used to determine a position and orientation of a component of machine 102.

GPS device 184 may include one or more devices that are capable of receiving, generating, storing, processing, and/or providing signals that may be used to determine the current position of the implement of machine 102 relative to an environment surrounding machine 102, a location of machine 102, a velocity of machine 102, a movement of machine 102, among other examples. IMU 182 and/or GPS device 184 may provide signals periodically (e.g., every twenty milliseconds, every fifty milliseconds, among other examples). Additionally, or alternatively, IMU 182 and/or GPS device 184 may provide signals based on a trigger (e.g., based on receiving a request from controller 140).

Wireless communication component 186 may include one or more devices that are capable of communicating with remote control device 190, as described herein. Wireless communication component 186 may include a transceiver, a separate transmitter and receiver, an antenna, among other examples. Wireless communication component 186 may communicate with remote control device 190 using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples. Additionally, or alternatively, wireless communication component 186 may communicate with remote control device 190 via a network that includes one or more wired and/or wireless networks.

Remote control device 190 may include one or more devices that are configured to be used for a remote control operation of machine 102 (e.g., a remote control operation without line-of-sight with respect to machine 102). For example, remote control device 190 may include one or more displays, one or more operator controls (similar to the operator controls of machine 102), one or more controllers (similar to controller 140), a wireless communication component (similar to wireless communication component 186), among other examples.

Remote control device 190 may establish a communication with machine 102 via the wireless communication component and may control machine 102 using the wireless communication. Remote control device 190 may display, via the one or more displays, a video feed (including image data obtained by a camera of machine 102). In some examples, remote control device 190 may include one or more input components (e.g., a keyboard, a microphone, joysticks, buttons, pedals, among other examples) that are used to provide input regarding the video feed.

As indicated above, FIG. 1 is provided as an example. Other examples may differ from what was described in connection with FIG. 1.

Figure 2:
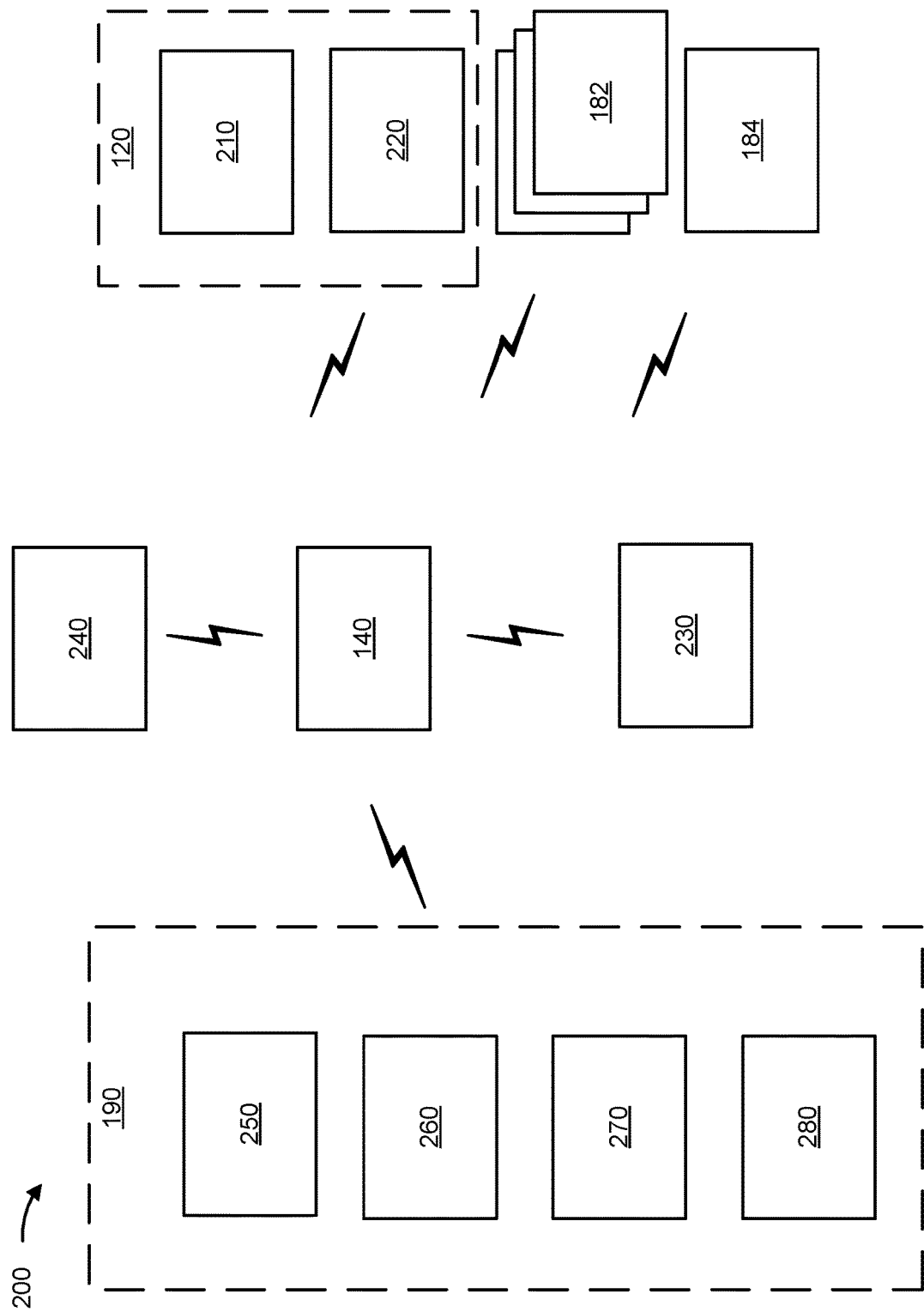
FIG. 2 is a diagram of an example system described herein.

FIG. 2 is a diagram of an example system 200 described herein. As shown in FIG. 2, system 200 includes sensor system 120, controller 140, one or more IMUs 182, GPS device 184, remote control device 190, valve 230, and a remote communication component 240. Some of the elements of FIG. 2 have been described above in connection with FIG. 1. While the example described herein refers to machine 102 being controlled by remote control device 190, machine 102 may be controlled by operator controls 132 of operator cabin 130. In this regard, actions (performed by remote control device 190 as described herein) may be performed onboard machine 102.

As shown in FIG. 2, sensor system 120 may include a pressure sensor device 210 and a position sensor device 220. Pressure sensor device 210 may include one or more devices capable of generating signals regarding a pressure associated with valve 230. For example, pressure sensor device 210 may generate valve pressure data indicating the pressure associated with valve 230. Position sensor device 220 may include one or more devices capable of generating signals regarding a position associated with valve 230 (e.g., opened position, closed position, among other examples). For example, position sensor device 220 may generate valve position data indicating the position associated with valve 230.

The pressure data and/or the valve position data may be generated periodically and/or based on a trigger, in a manner similar to the manner described above in connection with the signals generated by IMU 182 and/or GPS device 184. The pressure data and/or the valve position data may be used by controller 140 when determining a command (e.g., a valve command) to cause a movement of the implement, as described below. For example, the pressure data and/or the valve position data may be used by controller 140 to determine an appropriate current to provide to an actuator (e.g., an electric or electrohydraulic valve actuator) associated with valve 230 to enable a consistent operation of valve 230 (e.g., a consistent valve cylinder motion). The pressure data and the valve position data may be collectively referred to as valve data.

In some examples, controller 140 may be included in machine 102, as illustrated above in FIG. 1. Alternatively, controller 140 may be included in remote control device 190. Alternatively, controller 140 may be included in a device different than the remote control device 190 (hereinafter referred to as "controller associated device"). For instance, controller 140 may be part of a back office system.

Controller 140 may include a processor and a memory. The processor may be implemented in hardware, firmware, and/or a combination of hardware and software. The processor includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. The processor may be capable of being programmed to perform a function.

The memory includes a random-access memory (RAM), a read only memory (ROM), and/or another type of dynamic or static storage device (e.g., a flash memory, a magnetic memory, and/or an optical memory) that stores information and/or instructions for use by the processor to perform the function. For example, when performing the function, controller 140 may determine a current position of the implement of machine 102 and determine a command that causes the implement to move from the current position to a target position. The target position may be determined based on operator control data indicating a position of an operator control that controls a movement of the implement.

Controller 140 may determine the command based on signals (or data) from sensor system 120, an IMU 182, GPS device 184, and/or remote control device 190. In some examples, controller 140 may obtain the signals periodically (e.g., every thirty seconds, every minute, among other examples). Additionally, or alternatively, controller 140 may obtain the signals based on a trigger, such as a request from controller 140, a request from remote control device 190, among other examples. In some implementations, controller 140 may include a proportional-integral-derivative (PID) controller.

Remote control device 190 may include operator control 250, target position component 260, target position visualization component 270, and a wireless communication component 280. Operator control 250 may be similar to operator control 132 of machine 102. Operator control 250 may be configured to control an operation of machine 102. For example, operator control 250 may be configured to control a movement of the implement of machine 102 (e.g., based on different positions of operator control 250). For instance, operator control 250 may be configured to raise the implement (e.g., from a ground surface), lower the implement toward the ground surface, tilt the implement in a forward direction, tilt the implement in a backward direction, and/or tilt the implement in a lateral direction. Operator control 250 may be configured to generate operator control data indicating a position of operator control 250 that causes the movement of the implement.

Target position component 260 may include one or more devices configured to determine a target position of the implement of machine 102. For example, target position component 260 may be configured to determine the target position of the implement based on the operator control data. Target position component 260 may generate target position data indicating the target position of the implement based on the operator control data.

Target position visualization component 270 may include one or more devices configured to generate visual information indicating the target position of the implement. Target position visualization component 270 may provide the visual information to the one or more displays of remote control device 190 to facilitate an adjustment of the position of operator control 250 in order to adjust the target position, of the implement, to a desired position.

Valve 230 may be configured to control a flow of a hydraulic fluid that causes a movement of the implement. Remote communication component 240 may be similar to wireless communication component 186. For example, remote communication component 240 may include one or more devices that are capable of communicating with machine 102. For instance, commands for controlling an operation of machine 102 may be transmitted to machine 102 using remote communication component 240.

As explained above, remote control device 190 may be configured to control an operation of machine 102. For example, remote control device 190 may be configured to control the movement of the implement of machine 102. In this regard, an operator (of remote control device 190) may move operator control 250 to a position in order to control the movement of the implement. As a result of operator control 250 being moved, operator control 250 may generate operator control data indicating the position of operator control 250.

Target position component 260 may obtain the operator control data and may determine the target position of the implement based on the operator control data. In some implementations, target position component 260 may generate target position data indicating the target position of the implement based on the operator control data.

In some situations, when determining the target position of the implement, target position component 260 may determine a target velocity of the implement based on the position of the operator control indicated by the operator control data. The position of the operator control may be proportional to the target velocity. In some examples, target position component 260 may determine the target velocity of the implement by performing a lookup of a data structure that stores target velocities of the implement in association with positions of the operator control.

Target position component 260 may determine the target position of the implement based on the target velocity of the implement. In some examples, the target position may be an integral of the target velocity. Accordingly, target position component 260 may perform a mathematical computation, using the target velocity, to determine the target position.

In some implementations, target position component 260 may determine the target position of the implement based on a previous target position of the implement. As an example, target position component 260 may determine the target position of the implement based on a mathematical combination of the previous target position and the target velocity. For instance, target position component 260 may determine the target position by adding the previous target position and the target velocity.

The target position data may be provided to controller 140. As an example, target position component 260 may cause the target position data to be provided to controller 140 (e.g., using remote communication component 240).

In some implementations, target position visualization component 270 may generate visual information indicating the target position of the implement and provide the visual information to the one or more displays of remote control device 190. The visual information may be provided to facilitate an adjustment of the position of operator control 250 in order to achieve a different target position. The visual information may include graphical information indicating the target position of the implement. For example, the graphical information may include a first graphical element indicating the implement and a second graphical element indicating different possible positions of the implement. The first graphical element may be provided on a portion of the second graphical element corresponding to the target position of the implement.

Additionally, or alternatively to including the graphical information, the visual information may include textual information indicating the target position of the implement. For example, the textual information may include information identifying different percentages indicating different positions of the implement. For example, 0% may indicate that the implement is proximate to the ground surface, 100% may indicate that the implement is fully raised, −100% may indicate that the implement is fully lowered, and so on.

Controller 140 may determine a current position of the implement. For example, controller 140 may determine the current position of the implement based on current position data generated by one or more IMUS 182 and/or generated by GPS device 184. In some situations, controller 140 may determine the current position of the implement with respect to chassis 104 of machine 102 (e.g., based on the current position data generated by the one or more IMUs 182). Alternatively, controller 140 may determine the current position of the implement with respect to an environment surrounding the machine (e.g., based on the current position data generated by GPS device 184). In some situations, the current position of the implement with respect to chassis 104 of machine 102 may be preferred by operators of the remote control device and/or of machine 102.

After determining the current position of the implement, controller 140 may determine a command that causes the implement to move from the current position to the target position. Controller 140 may determine the command based on the target position and the current position. In some examples, when determining the command, controller 140 may determine a valve command (based on the current position and the target position) to control an operation of valve 230. The valve command may be used to control the flow of the hydraulic fluid to cause the implement to move from the current position to the target position. In some situations, controller 140 may determine a difference between the current position and the target position and determine the valve command based on the difference.

In some examples, controller 140 may determine the valve command further based on the pressure data (e.g., generated by pressure sensor device 210) and/or the valve position data (e.g., generated by position sensor device 220). For example, as explained above, controller 140 may determine the valve command based on the pressure data and/or the valve position data to enable a consistent operation of valve 230.

Controller 140 may provide the command to cause the implement to move from the current position to the target position. For example, controller 140 may provide the valve command to valve 230 to cause valve 230 to control the flow of the hydraulic fluid to cause the implement to move from the current position to the target position.

The system may be configured to continually provide valve commands to ensure that the current position of the implement is the target position of the implement. In some situations, a change in a position or an orientation of machine 100 may cause the implement to no longer be at the target position despite the operator control data remaining the same. In this regard, the system may be configured to constantly monitor the current position of the implement to ensure that the current position is the target position and provide a command to cause the implement to move to the target position.

In some situations, based on the visual information, the operator may adjust the position of operator control 250 to cause the target position of the implement to be adjusted to a different target position. In this regard, operator control 250 may generate different operator control data to cause the implement to move from the target position to a different target position, in a manner similar to the manner described above.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
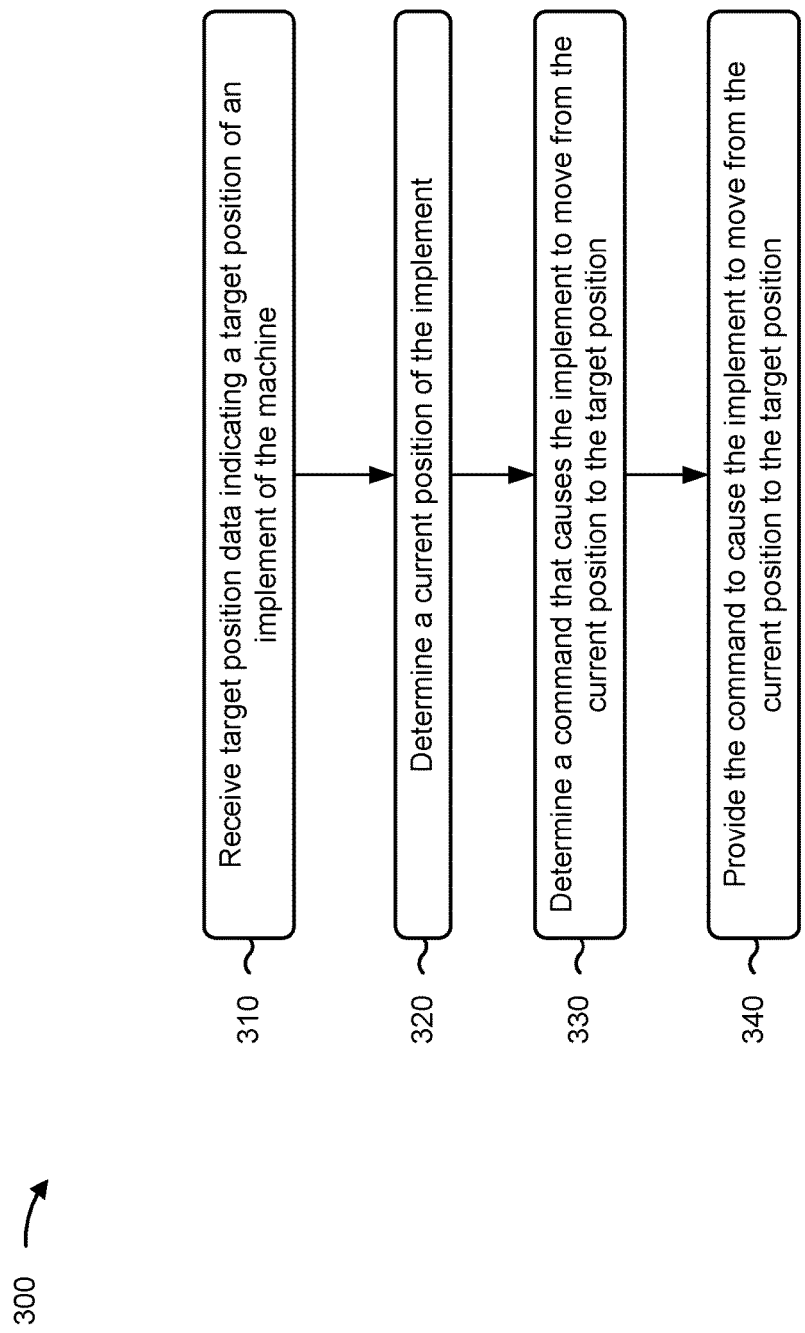
FIG. 3 is a flowchart of an example process associated with controlling an implement based on a target position of the implement.

FIG. 3 is a flowchart of an example process 300 associated with controlling an implement based on a target position of the implement. In some implementations, one or more process blocks of FIG. 3 may be performed by a controller (e.g., controller 140). In some implementations, one or more process blocks of FIG. 3 may be performed by another device or a group of devices separate from or including the one or more devices, such as a remote control device (e.g., remote control device 190).

As shown in FIG. 3, process 300 may include receiving target position data indicating a target position of an implement of the machine, the target position being determined based on operator control data indicating a position of an operator control associated with the machine (block 310). For example, the one or more devices may receive target position data indicating a target position of an implement of the machine, the target position being determined based on operator control data indicating a position of an operator control associated with the machine, as described above.

As further shown in FIG. 3, process 300 may include determining a current position of the implement (block 320). For example, the one or more devices may determine a current position of the implement, as described above.

In some implementations, determining the current position of the implement comprises determining the current position of the implement with respect to a chassis of the machine. In some implementations, determining the current position of the implement comprises determining the current position of the implement with respect to an environment surrounding the machine.

As further shown in FIG. 3, process 300 may include determining a command that causes the implement to move from the current position to the target position, wherein the command is determined based on the target position and the current position (block 330). For example, the one or more devices may determine a command that causes the implement to move from the current position to the target position, wherein the command is determined based on the target position and the current position, as described above. In some implementations, the command is determined based on the target position and the current position.

In some implementations, determining the command comprises determining, based on the current position and the target position, a valve command to control an operation of a valve, wherein the valve controls a flow of a hydraulic fluid that causes a movement of the implement, and wherein the valve command is provided to the valve to cause the valve to control the flow of the hydraulic fluid to cause the implement to move from the current position to the target position.

In some implementations, determining the valve command comprises determining a difference between the current position and the target position, and determining the valve command, based on the difference, to control the flow of the hydraulic fluid.

As further shown in FIG. 3, process 300 may include providing the command to cause the implement to move from the current position to the target position (block 340). For example, the one or more devices may provide the command to cause the implement to move from the current position to the target position, as described above.

In some implementations, process 300 includes determining a target velocity of the implement based on the position of the operator control indicated by the operator control data, and determining the target position of the implement based on the target velocity.

In some implementations, the operator control data may be a first operator control data and the target position may be a first target position. The operator control may generate second operator control data indicating the adjustment of the position of the operator control after the visual information is provided. The target position component may be further configured to receive the second operator control data; determine a second target position of the implement of the machine based on the second operator control data; and provide, to the controller of the machine, information identifying the second target position to cause the implement to move to the second target position. To determine the second target position, the target position component may further be configured to determine the second target position further based on the first target position.

In some implementations, process 300 includes generating visual information indicating the target position of the implement, and providing the visual information to facilitate an adjustment of the position of the operator control.

The command may be a first command. Process 300 may include determining an updated current position of the implement after providing the first command; determining a second command that causes the implement to move from the updated current position to the target position, wherein the second command is determined based on the target position and the updated current position; and providing the second command to cause the implement to move from the updated current position to the target position.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The present disclosure is directed to a system for remotely controlling an implement of a machine using a remote control device. In some implementations, the system may determine a target position of the implement based on operator control data indicating a position of an operator control (e.g., a joystick) of the remote control device. The system may determine a current position of the implement and determine a command that causes the implement to move from the current position to the target position.

Currently, a wireless transmission of commands, from an existing remote control device, may be subject to latency.

For example, a wireless transmission of an amount of a movement of a joystick (of the remote control device) may be delayed. As a result of the delayed transmission of the amount of the movement of the joystick, the movement of the implement (that is to occur as a result of the movement of the joystick) may be delayed.

Accordingly, the latency may negatively affect an operation of the machine using the existing remote control device. The latency may create a measure of uncertainty with respect to a command provided by the existing remote control device and a resulting position of the implement. In this regard, a measure of quality of work performed using the existing remote control device may be less than a measure of quality of work performed using an operator control in an operator cabin of the machine. Additionally, the latency may cause numerous attempts of a same operation to be performed prior to achieving a desired result, thereby consuming computing resources, network resources, and other resources.

By determining the target position of the implement, providing commands to cause the implement to move from the current position to the target position, and providing visual information regarding the target position of the implement, the present disclosure solves one or more of the problems set forth above with respect to latency. For example, a majority of commands to control the implement (e.g., to maintain a smooth ground surface) are performed on board the machine. Accordingly, such commands are not subject to the latency (associated with transmitting commands to and from the remote control device).

Additionally, the system of the present disclosure reduces a delay associated with providing feedback regarding a position of the implement resulting from a command by the remote control device. The delay may be reduced by providing visual information regarding the target position of the implement on the remote control device.

Accordingly, the system of the present disclosure may improve a measure of quality of work performed using the remote control device. Additionally, the system of the present disclosure may reduce a quantity of attempts of performing a same operation to achieve a desired result, thereby preserving computing resources, network resources, operator time, machine wear, fuel, and other resources that would have been used to perform the numerous attempts of a same operation.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method performed by one or more devices associated with a machine, the method comprising:
   receiving target position data indicating a target position of an implement of the machine,
      the target position being determined based on a previous target position of the implement and based on a target velocity that is determined based on operator control data indicating a position of an operator control associated with the machine;
   determining a current position of the implement;
   determining a difference between the current position and the target position;
   determining, based on the difference, a command that causes the implement to move from the current position to the target position; and
   providing the command to cause the implement to move from the current position to the target position.

2. The method of claim 1, wherein determining the current position of the implement comprises:
   determining the current position of the implement with respect to a chassis of the machine.

3. The method of claim 1, wherein determining the current position of the implement comprises:
   determining the current position of the implement with respect to an environment surrounding the machine.

4. The method of claim 1,
   wherein the command comprises a valve command to control an operation of a valve,
   wherein the valve controls a flow of a hydraulic fluid that causes a movement of the implement, and
   wherein the valve command is provided to the valve to cause the valve to control the flow of the hydraulic fluid to cause the implement to move from the current position to the target position.

5. The method of claim 1, wherein the command comprises a valve command to control a flow of a hydraulic fluid.

6. The method of claim 1, wherein the command is a first command, and wherein the method further comprises:
   determining an updated current position of the implement after providing the first command;
   determining a second command that causes the implement to move from the updated current position to the target position,
      wherein the second command is determined based on the target position and the updated current position; and
   providing the second command to cause the implement to move from the updated current position to the target position.

7. A system comprising:
a controller, of a machine, configured to:
   determine a target velocity, of an implement of the machine, based on operator control data indicating a position of an operator control associated with the machine;
   determine a target position of the implement based on a previous target position of the implement and based on the target velocity;
   determine a current position of the implement;
   determine a difference based on the current position and the target position;
   determine, based on the difference, a command that causes the implement to move from the current position to the target position; and
   provide the command to cause the implement to move from the current position to the target position.

8. The system of claim 7, further comprising:
one or more sensor devices configured to generate current position data indicating the current position of the implement, and
   wherein, to determine the current position of the implement, the controller is further configured to:
      determine the current position of the implement based on the current position data.

9. The system of claim 7, wherein, to determine the current position, the controller is further configured to:
   determine the current position of the implement with respect to a chassis of the machine; or
   determine the current position of the implement with respect to an environment surrounding the machine.

10. The system of claim 7,
wherein the command is a valve command to control an operation of a valve,
wherein the valve is configured to control a flow of a hydraulic fluid that causes a movement of the implement, and
wherein the valve command is configured to cause the valve to control the flow of the hydraulic fluid to cause the implement to move from the current position to the target position.

11. The system of claim 7, further comprising:
a remote control device, associated with the machine, comprising:
   an operator control configured to:
      generate operator control data indicating a position of the operator control; and
   a target position component configured to:
      receive the operator control data;
      determine the target position of the implement of the machine based on the operator control data; and
      provide, to the controller of the machine, information identifying the target position to cause the implement to move to the target position.

12. The system of claim 11, wherein the remote control device further comprises:
a target position visualization component configured to:
   generate visual information indicating the target position of the implement; and
   provide the visual information, for display, to facilitate an adjustment of the position of the operator control.

13. The system of claim 12,
wherein the operator control data is a first operator control data,
wherein the target position is a first target position,
wherein the operator control is further configured to:
      generate second operator control data indicating the adjustment of the position of the operator control after the visual information is provided, and
wherein the target position component is further configured to:
      receive the second operator control data;
      determine a second target position of the implement of the machine based on the second operator control data; and
      provide, to the controller of the machine, information identifying the second target position to cause the implement to move to the second target position.

14. The system of claim 13, wherein, to determine the second target position, the target position component is further configured to:
   determine the second target position further based on the first target position.

15. A controller of a machine, the controller comprising:
one or more memories; and
one or more processors configured to:
   receive target position data indicating a target position of an implement of the machine,
      the target position being determined based on a previous target position of the implement and based on a target velocity that is determined based on operator control data indicating a position of an operator control associated with the machine;
   determine a current position of the implement;
   determine a difference based on the current position and the target position;
   determine, based on the difference, a command that causes the implement to move from the current position to the target position; and
   provide the command to cause the implement to move from the current position to the target position.

16. The controller of claim 15,
wherein, the command comprises a valve command to control an operation of a valve, and
wherein the valve controls a flow of a hydraulic fluid that causes a movement of the implement.

17. The controller of claim 15, wherein, to determine the command, the one or more processors are further configured to:
   receive, from one or more sensor devices, valve data that indicates at least one of a pressure associated with a valve or a position of the valve; and
   determine the command based on the difference and the valve data.

18. The controller of claim 15,
wherein the command is a first command, and
wherein the one or more processors are further configured to:
   determine an updated current position of the implement after providing the first command;
   determine, based on the target position and the updated current position, a second command that causes the implement to move from the updated current position to the target position; and
   provide the second command to cause the implement to move from the updated current position to the target position.

19. The controller of claim 15, wherein, to determine the current position, the one or more processors are further configured to:
   determine the current position of the implement with respect to a chassis of the machine; or determine the current position of the implement with respect to an environment surrounding the machine.

20. The system of claim 7, further comprising:
a remote control device, associated with the machine, configured to:
  provide, to one or more displays of the remote control device, visual information that includes a first graphical element indicating the implement and a second graphical element indicating different possible positions of the implement,
    the visual information providing the first graphical element on a portion of the second graphical element corresponding to the target position of the implement.

* * * * *